(12) United States Patent
Hoskinson et al.

(10) Patent No.: US 7,367,880 B2
(45) Date of Patent: May 6, 2008

(54) METHOD AND APPARATUS FOR MONITORING CHARACTERISTICS OF A FLOW PATH HAVING SOLID COMPONENTS FLOWING THERETHROUGH

(75) Inventors: Reed L. Hoskinson, Rigby, ID (US); John M. Svoboda, Idaho Falls, ID (US); William F. Bauer, Idaho Falls, ID (US); Gracy Elias, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 303 days.

(21) Appl. No.: 10/888,815

(22) Filed: Jul. 8, 2004

(65) Prior Publication Data
US 2006/0009269 A1    Jan. 12, 2006

(51) Int. Cl.
*A01F 12/44* (2006.01)
(52) U.S. Cl. .................. 460/5; 56/10.2 R; 460/4
(58) Field of Classification Search ......... 56/10.2 R, 56/10.2 B, 10.2 A, 10.2 C; 460/4–7, 1, 2; 382/103, 110; 209/536
See application file for complete search history.

(56) References Cited

U.S. PATENT DOCUMENTS

| | | | |
|---|---|---|---|
| 3,097,744 A * | 7/1963 | Leaver et al. ............... 209/564 |
| 3,574,307 A | 4/1971 | Theobald |
| 3,935,866 A | 2/1976 | Northup et al. |
| 4,036,065 A | 7/1977 | Strelioff et al. |
| 4,130,980 A | 12/1978 | Fardal et al. |
| 4,337,611 A * | 7/1982 | Mailander et al. ............. 460/7 |
| 4,348,855 A * | 9/1982 | DePauw et al. ............... 460/1 |
| 4,421,772 A * | 12/1983 | Munck et al. ............. 426/231 |
| 4,481,756 A | 11/1984 | Schartz |
| 4,513,562 A | 4/1985 | Strubbe |
| 4,517,792 A | 5/1985 | Denning et al. |
| 4,527,241 A * | 7/1985 | Sheehan et al. ............... 701/50 |
| 4,540,003 A | 9/1985 | Osselaere |
| 4,825,146 A | 4/1989 | Kotyk et al. |
| 4,933,589 A | 6/1990 | Strubbe |
| 4,934,985 A * | 6/1990 | Strubbe ...................... 460/4 |
| 4,944,314 A * | 7/1990 | Bolt ......................... 131/280 |
| 4,946,046 A * | 8/1990 | Affleck et al. ............. 209/580 |
| 4,951,031 A | 8/1990 | Strubbe |

(Continued)

FOREIGN PATENT DOCUMENTS

GB          1 270 535          3/1968

*Primary Examiner*—Thomas B. Will
*Assistant Examiner*—Joel F Mitchell
(74) *Attorney, Agent, or Firm*—Trask Britt

(57) ABSTRACT

A method and apparatus is provided for monitoring a flow path having plurality of different solid components flowing therethrough. For example, in the harvesting of a plant material, many factors surrounding the threshing, separating or cleaning of the plant material and may lead to the inadvertent inclusion of the component being selectively harvested with residual plant materials being discharged or otherwise processed. In accordance with the present invention the detection of the selectively harvested component within residual materials may include the monitoring of a flow path of such residual materials by, for example, directing an excitation signal toward of flow path of material and then detecting a signal initiated by the presence of the selectively harvested component responsive to the excitation signal. The detected signal may be used to determine the presence or absence of a selected plant component within the flow path of residual materials.

30 Claims, 5 Drawing Sheets

U.S. PATENT DOCUMENTS

| | | |
|---|---|---|
| 5,015,997 A | 5/1991 | Strubbe |
| 5,046,362 A | 9/1991 | Strubbe |
| 5,108,249 A | 4/1992 | Kinzenbaw et al. |
| 5,199,248 A | 4/1993 | Hale et al. |
| 5,312,299 A | 5/1994 | Behnke et al. |
| 5,557,912 A | 9/1996 | Voss et al. |
| 5,733,592 A * | 3/1998 | Wettstein et al. ............ 426/416 |
| 5,751,421 A * | 5/1998 | Wright et al. ................ 356/328 |
| 5,865,990 A | 2/1999 | Novak et al. |
| 5,951,395 A | 9/1999 | Peter |
| 5,973,286 A | 10/1999 | Wan |
| 5,986,230 A | 11/1999 | Novak et al. |
| 6,059,117 A | 5/2000 | Novak et al. |
| 6,119,442 A * | 9/2000 | Hale ........................ 56/10.2 H |
| 6,252,188 B1 | 6/2001 | Zapata et al. |
| 6,421,990 B1 * | 7/2002 | Ohlemeyer et al. ....... 56/10.2 R |
| 6,449,932 B1 * | 9/2002 | Cooper et al. ............ 56/10.2 R |
| 6,526,120 B1 | 2/2003 | Gray et al. |
| 6,591,145 B1 | 7/2003 | Hoskinson et al. |
| 2003/0186730 A1 | 10/2003 | Hoskinson et al. |

* cited by examiner

METHOD AND APPARATUS FOR MONITORING CHARACTERISTICS OF A FLOW PATH HAVING SOLID COMPONENTS FLOWING THERETHROUGH

GOVERNMENT RIGHTS

The present invention was made under CRADA (Cooperative Research and Development Agreement) CNH-CRADA99-CR-07 between CNH Global N.V. and Idaho National Engineering and Environmental Laboratory operated for the United States Department of Energy. The Federal Government has certain rights in this invention.

BACKGROUND OF THE INVENTION

1. Field of the Invention

The present invention relates generally to monitoring characteristics of a flow path and, more particularly, to monitoring a flow path which includes solid components such as, for example, grain or other components of a harvested plant material.

2. State of the Art

Combine harvesters are conventionally used in harvesting a wide variety of crop materials. Such combine harvesters may be used to cut a crop or plant material from the field or, they may be used to collect a crop or plant material which has already been cut and arranged in what is known as a windrow within the crop field. Upon collection of the crop or plant material, the material is conventionally passed through a threshing and separating mechanism of the combine harvester to separate the grain therefrom. The grain, along with other impurities such as, for example, chaff, dust, leaves or other straw particles, is fed to a cleaning mechanism to further clean and separate the grain from such impurities. Such a cleaning mechanism might include one or more sieves with an air stream directed therethrough to assist in the removal of chaff and residual straw.

The grain, now separated and cleaned from the crop material, is collected and temporarily stored in a grain tank located on the combine harvester while the residual material (i.e., material other than grain) is conventionally discharged from the combine harvester back onto the crop field. In some combine harvesters the residual material may be "rethreshed" such as by processing it through another threshing and separating mechanism to increase the amount of grain recovered.

The residual materials, such as the straw and chaff, may be discharged from the combine harvester in scattered manner for reintroduction into the soil as a nutrient therefor, or they may be discharged in a narrow row for subsequent collection by another machine. For example, a baler may pass across the field to collect and package (bale) the discharged residual material.

As a practical matter, the harvesting of grain or some other crop material is not a completely efficient process. In other words, some of the material being harvested (e.g., the grain) may be discharged with what is considered to be the residual plant material. Various grain-loss sensors have been developed in the past in an effort to determine the amount of grain being discharged with residual plant material. Conventionally, such sensors have included a piezoelectric transducer which is configured to produce an electrical signal in response the impingement of a material upon a surface of the sensor. Such sensors have been placed, for example, at the discharge end of a cleaning mechanism, to determine whether kernels of grain are intermixed with the residual plant material which is being discharged from the combine harvester.

Generally, such a piezoelectric sensor has been employed in an effort to detect the impingement of a component having a minimum specified mass while remaining unaffected by other materials exhibiting a mass below the specified minimum. Thus, for example, it was intended that a grain kernel would be detected by the sensor while residual material such as straw, leaves, etc., would not be detected by the sensor due to their relative lack of mass in comparison with the grain kernel. However, such sensors do not necessarily provide an accurate indication of the amount of grain being discharged, or otherwise processed, with residual plant materials. Rather, such piezoelectric grain loss sensors often do not distinguish between, for example, a grain kernel and a large piece of straw. Thus, the electrical signal generated by such a sensor may inaccurately indicate that a significant amount of grain is being discharged with the residual material. Such an indication may persuade an operator of the combine harvester to change one or more operating parameters thereof. The changes made to the any operating parameters in response to the indications of the grain loss sensor may, thus, be improper and cause the combine harvester to operate inefficiently.

While various attempts have been made to improve such grain loss sensors, there remains a need to provide an accurate grain loss sensor which properly discriminates and differentiates between multiple components (e.g., between grain kernels and straw) within a flow path and which provides an accurate indication of the same.

Thus, in view of the shortcomings in the art, it would be advantageous to provide a method and apparatus for accurately monitoring one or more characteristics of a flow path which includes a solid component flowing therethrough. It would further be advantageous to utilize such a method and apparatus in conjunction, for example, with a combine harvester to optimize the production of such a harvester such that the desired component of a crop or plant material may be more efficiently harvested.

BRIEF SUMMARY OF THE INVENTION

In accordance with one aspect of the invention a combine harvester is provided. The combine harvester includes a feeding system which is located and configured to gather plant material as the combine harvester traverses a field. A threshing system is located and configured to receive the plant material from the feeding system and thresh at least one selected plant component from the plant material. A cleaning system is located and configured to substantially separate the selected plant component from residual plant material. A monitoring apparatus is located and configured to detect the presence of the selected plant component from residual material in a defined flow path. The monitoring apparatus may include an excitation source and a sensor configured to detect a response signal initiated by the presence of the at least one selected plant component.

In accordance with another aspect of the present invention, an apparatus is provided for monitoring a flow path having at a plurality of solid components flowing therethrough. The apparatus includes at least one excitation source configured to emit an excitation signal toward or across at least a portion of the flow path, and at least one sensor configured to detect a response initiated by the presence of the at least one select component of the plurality of solid components responsive to the excitation signal. The apparatus may further include structure for at least partially isolating the at least a portion of the flow path from an external excitation source.

In accordance with yet another aspect of the present invention, a method of harvesting a plant material is provided. The method includes gathering the plant material and threshing at least one selected component from the plant material. The at least one selected component is substantially separated from residual plant material. At least one flow path is provided for transporting at least one of the at least one selected component and the residual plant material. An excitation signal is emitted toward at least a portion of the at least one flow path and a signal initiated by the presence of the at least one selected component responsive to the in the at least a portion of the at least one flow path excitation signal is detected.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
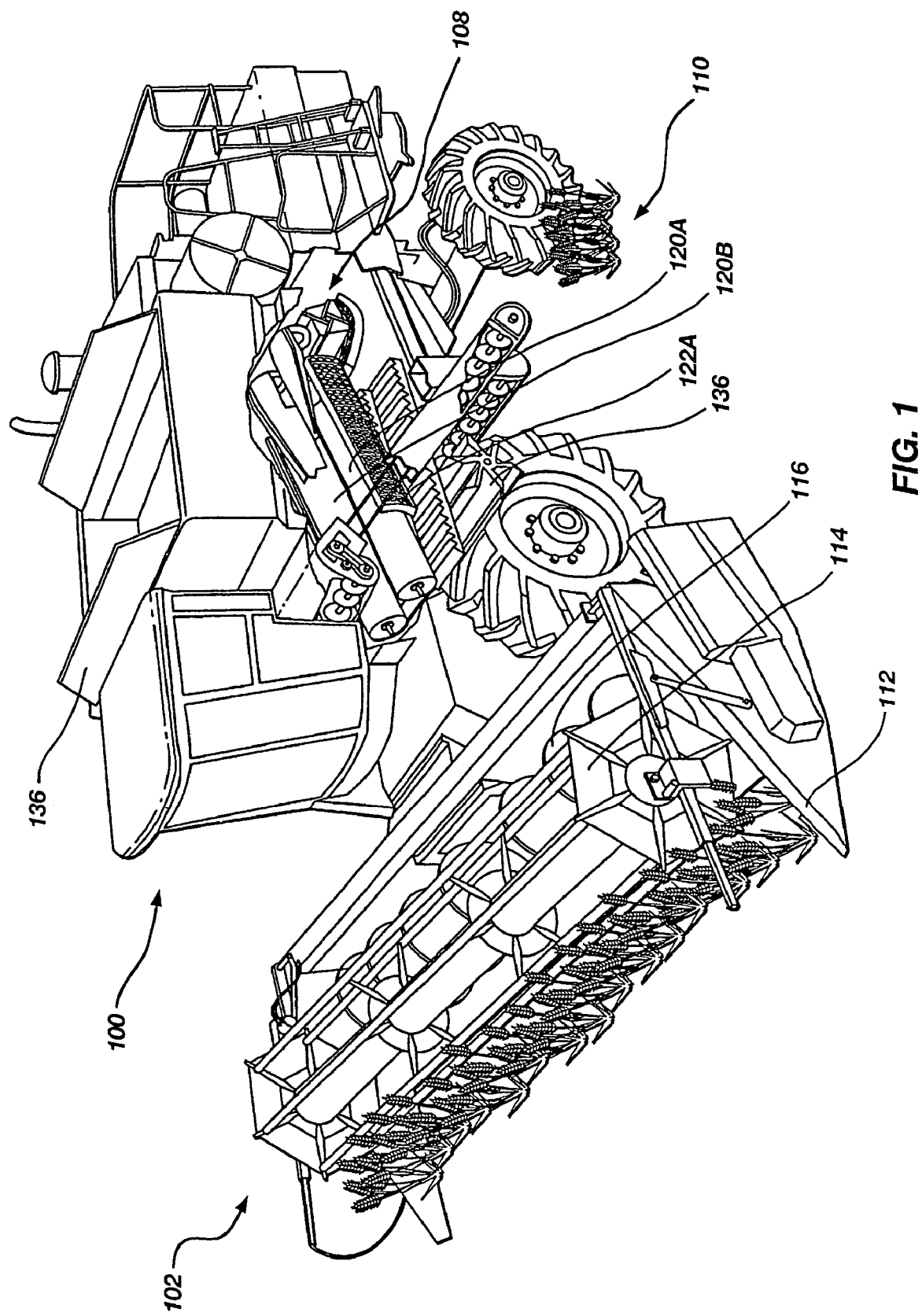
FIG. 1 is a perspective view of a harvesting apparatus in accordance with an embodiment of the present invention.
Figure 2:
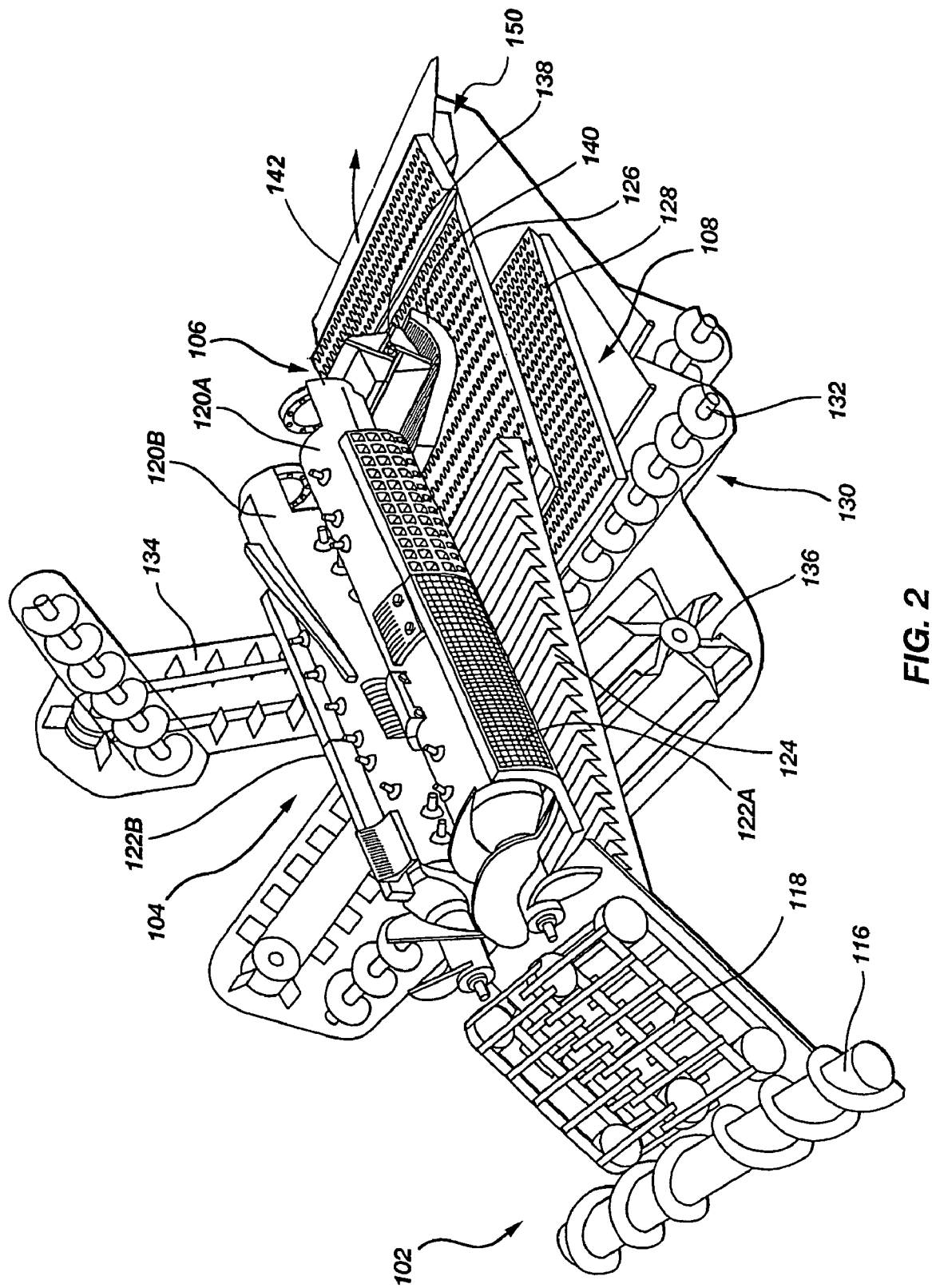
FIG. 2 is a perspective view of various operating systems associated with the harvesting apparatus shown in FIG. 1.

Referring to FIGS. 1 and 2, FIG. 1 shows an exemplary combine harvester 100 while FIG. 2 is a perspective view of various internal components and operating systems of the combine harvester 100. It is noted that the combine harvester 100 shown and described with respect to FIGS. 1 and 2 is exemplary and that other configurations may be used in practicing the present invention as will be appreciated by those of ordinary skill in the art. Furthermore, it is to be understood that the present invention may be used in harvesting various types of grain including, for example, wheat, barley and oats, as well as other crops such as, for example, corn, soybeans, peas and the like.

In operation, the combine harvester 100 may effectively implement multiple systems in harvesting a grain or other plant component. Such systems may generally include, for example, a feeding system 102, a threshing system 104, a separation system 106 and a cleaning system 108 as shall be discussed in further detail below. The combined operation of such systems enables the extraction and separation of a particular plant component (e.g., grain kernels) from a plant material 110.

As the combine harvester 100 traverses a crop field, the plant material 110 is gathered into the feeding system 102 which may include a mower 112 for cutting the plant material 110. In another embodiment, the plant material 110 may be collected from a previously prepared windrow. The plant material 110 is collected by a header rake 114 and auger 116 and transported by an elevator 118 into the threshing system 104 of the combine harvester 100.

The threshing system 104 may include one or more rotors 120A and 120B, each positioned within an associated concave 122A and 122B (or within a single, integral concave which services multiple rotors) such that the gathered plant material passes between the rotors 120A and 120B and their respective concaves 122A and 122B. The concaves 122A and 122B may include a curved screen or grate defining multiple openings therein wherein each concave includes a section shaped and configured to generally complimentarily engage the rotors 120A and 120B. The rotors 120A and 120B are positioned adjacent to the concaves 122A and 122B and rotate about defined axes to provide a rubbing action and, thereby, exert a force against the plant material as it passes between the rotors 120A and 120B and their respective concaves 122A and 122B. The rubbing action and associated force applied to the plant material causes a separation of the grain (or other desired plant component) from the remainder of the plant material. In other terms, the rotation of the rotors 120A and 120B, in concert with the stationary concaves 122A and 122B, provides a threshing action for the plant material passing therethrough. The openings in the concaves 122A and 122B allow the separated grain to fall through the concave 122A and 122B into a grain pan 124.

As the plant is subjected to the threshing action of the rotors 120A and 120B and concaves 122A and 122B, the harvested component (referred to herein as the grain) generally takes one path while most of chaff or residue takes another. The grain, which falls through the openings of the concaves 122A and 122B into a grain pan 124, proceeds from the grain pan 124 to a cleaning system 108 which may include a chaffer sieve 126 and a cleaning sieve 128. Both the chaffer sieve 126 and the cleaning sieve 128 have perforations or openings which enable the grain to pass therethrough to a collection device 130 while retaining chaff or other residue from the plant material. The collection device 130 may include, for example, an auger 132 which transports the collected grain to an elevator 134. The elevator 134 subsequently transports the grain which causes the separated and cleaned grain to be transported to a grain tank 136 for the temporary storage thereof.

Both the chaffer sieve 126 and the cleaning sieve 128 may be shaken or vibrated to further separate the grain from excess chaff and other residual plant material that were not previously separated from the grain. A variable speed fan 136 is also employed in the process of cleaning and separating the grain from the chaff or residue. The fan 136 may blow air across the chaff sieve 126 and cleaning sieve 128 so as to remove the relatively lighter chaff and other residual plant materials while allowing the relatively heavier grain to fall through the openings in the chaff sieve 126 and cleaning sieve. The speed of the fan 136 can have a significant effect on grain loss and the quality of overall crop yield. For example, if the fan 136 produces too much air, then excessive grain will be lost (i.e., grain will be blown off of the chaff sieve 126 and/or cleaning sieve 128 with other residual materials). On the other hand, if the fan 136 is not producing enough air flow, then the grain will not be properly cleaned. Moreover, if the fan 136 is not providing adequate air flow, the chaff sieve 126 and/or cleaning sieve 128 may become plugged, which may ultimately result in lost time and additional grain loss. By producing or generating a desirable air flow across the cleaning sieves, a clean grain product may be achieved and grain loss may be minimized.

The residual materials which have been separated from the grain by the fan 136 and the sieves 126 and 128 may be expelled, for example, through the rear of the grain combine 100. However, in another embodiment, the residual materials may be subjected to a rethreshing mechanism in an effort to further maximize the grain yield of a harvested plant material as will be appreciated by those of ordinary skill in the art. In yet another embodiment, the residual plant material may be subjected to additional threshing and/or separating processes in an effort to harvest another selected plant component therefrom. Such a process is described in copending U.S. patent application Ser. No. 10/112,021 for METHOD AND APPARATUS FOR SELECTIVELY HARVESTING MULTIPLE COMPONENTS OF A PLANT MATERIAL, filed on Mar. 28, 2002, the disclosure of which is incorporated, in its entirety, by reference herein.

In one example, a specific component being harvested may include the internodal stems of a plant material. In such an example, after the grain is harvested, the residual material is processed to break apart and separate the nodes of the plant material from the remainder of the straw or stem. The portions of the stem located between the nodes, or the internodal stems, may then be harvested and collected for a specified use. In the case of harvesting internodal stems, the internodal stems may be subsequently used, for example, as a fuel source as set forth in the above-referenced copending application.

Still referring to FIGS. 1 and 2, the residual plant material which does not fall through the concaves 122A and 122B may be directed through the separation system 106 which may include a beater 138 and grate 140 or other mechanism to extract or thresh any remaining grain from the residual material. Grain separated in this manner may fall through openings in the grate 140 into the cleaning system 108 and is further cleaned and separated as described above. The residual material may then pass from the beater 138 and grate 140 over a discharge plate 142 or chute to be discharged from the rear of the combine 100. Any grain which may be mixed in with the residual material is also discharged from the rear of the combine 100 and is not conventionally recoverable.

Many different variables may have an effect on the amount of grain lost from the combine 100 (i.e., the grain discharged with the residual plant material). For example, the speed of the fan 136, the ground speed or velocity of the combine 100, the rate at which the feeding system 102 gathers the crop or plant material, the speed of the rotors 120A and 120B, the force being applied between the rotors 120A and 120B and concaves 122A and 122B, the size of the openings in the sieves 126 and 128, are all parameters which may influence the harvest of the grain from a plant material but which are largely within the control of an operator the combine 100. Other variables may also influence the efficiency with which grain is harvested from a plant material, but which may be beyond any substantial control of an operator, such as the moisture content of the plant material being harvested, or the temperature and/or humidity within the combine surrounding the various systems 102, 104, 106 and 108.

In an effort to optimize the harvesting of grain by the combine harvester 100, it may be desirable to monitor the flow path of the plant material at one or more locations within the combine 100. For example, it may be desirable to monitor the flow of any residual material exiting the rear of the combine 100 to determine how much grain, if any, is undesirably being discharged with the residual material. Thus, a monitoring apparatus 150 may be disposed adjacent a flow path of plant material (e.g., at or near the discharge plate 142 or chute) so as to monitor the flow of residual material being discharged from the combine 100. The monitoring apparatus 150 is desirably configured to accurately discriminate and differentiate between a component being selectively harvested (e.g., a grain kernel) and residual materials (e.g., straw, leaves, chaff, etc.).

Figure 3A:
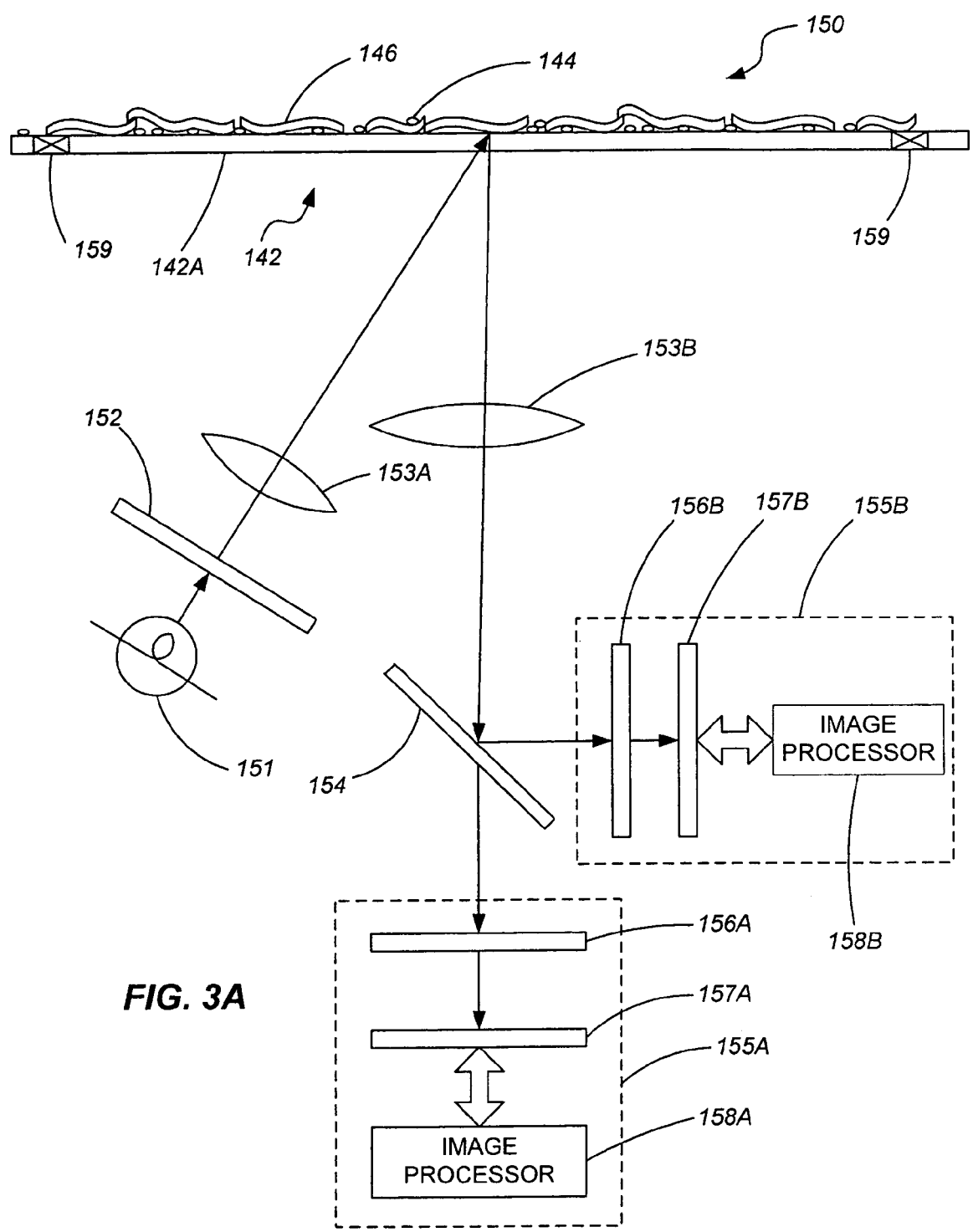
FIGS. 3A and 3B show a monitoring apparatus which may be used in conjunction with the harvesting apparatus of FIG. 1.
Figure 3B:
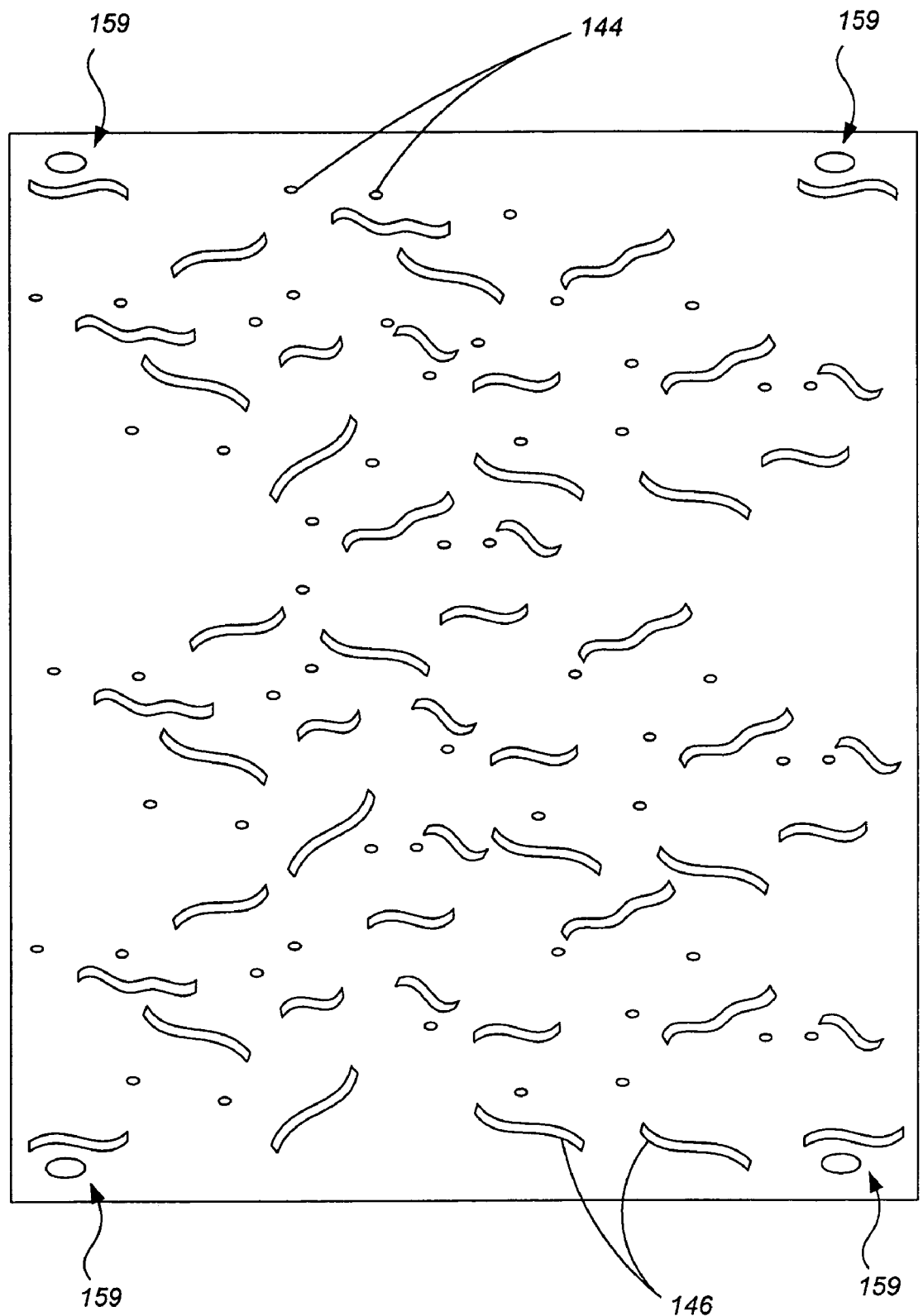

Referring to FIGS. 3A and 3B, an exemplary monitoring apparatus 150 is configured to discriminate and differentiate between a first component 144 (e.g., a grain kernel) and a second component 146 (e.g., a straw). The monitoring apparatus 150 may include an excitation source 151 such as, for example, a strobe light, one or more light emitting diodes (LEDs), or some other appropriate source. In one embodiment, the excitation source 151 may include a strobe light having a frequency of 100 microseconds (μsec).

The excitation signal emitted from the excitation source 151, such as a beam of light, may be passed through a filter 152. In one embodiment, the filter may include, for example, a narrow band pass filter configured to allow light having a wave length of approximately 375 nm to pass therethrough. The filtered light may then pass through a first lens 153A to focus, diffuse or direct the light so that it is cast upon a plate member 142A which may, for example, be formed as part of the discharge plate 142 or of some other component across which residual material may pass. The plate member 142A may be desirably formed of a substantially transparent or pellucid material which is also substantially scratch resistant. For example, in one embodiment, the plate member 142A may be formed of a quartz glass, although other materials be used.

The filtered light passes through the plate member 142A to the residual material (including the first component 144 and the second component 146) which is passing across the upper surface of the plate member 142A. The filtered light acts as an excitation signal to fluorescently excite the residual material flowing across the plate member 142A. The fluorescent response of the residual material may be analyzed to determine what types of plant components are flowing over the plate member 142A.

For example, it has been determined that different portions of a given plant material (e.g., grain vs. straw) emit different fluorescent signals responsive to appropriate excitation. Also, one plant material may emit different fluorescent signal than another plant material (e.g., wheat vs. barley). Generally, as will be appreciated by those of ordinary skill in the art, fluorescence occurs when an external excitation source provides an excitation photon to the surface of a given material, the excitation photon is absorbed by the material, thereby raising the material's energy state, and then a photon is subsequently emitted from the material wherein the emitted photon exhibits a longer wavelength than that of the excitation photon. The detection of fluorescence properties thus requires discrimination between the emitted photon and the excited photon.

Still referring to FIGS. 3A and 3B, an image of the residual material, as excited by the excitation source 151, is projected from the plate member 142A and to a second lens 153B which may focus the image as desired. The image then encounters a beam splitter 154 which allows a first beam to pass therethrough to a first analyzer 155A, and directing a second beam to a second analyzer 155B. The first analyzer 155A may include a filter 156A, such as a narrow band pass filter configured to allow a light of a desired wavelength therethrough, and a sensor 157A configured to detect the light transmitted through the filter 156A. In one embodiment, the sensor 157A may include an image charge-coupled device (CCD) array. The sensor 157A detects the filtered light and generates a signal representative of the light, the signal being transmitted to an image processor 158A.

The second analyzer 155B may be configured similarly to that of the first analyzer 155A having a filter 156B, a sensor 157B and an image processor 158B. The first analyzer 155A may, for example, be configured to detect the presence of the first component 144 in the residual material while the second analyzer may be configured to detect the presence of the second component 146 in the residual material. Such may be accomplished, for example, by setting the wavelength of each filter 156A and 156B to correspond with an expected excitation signal associated with a defined component (e.g., the first component 144 or the second component 146).

The plate member 142A may be configured to include a reference pattern 159. For example, in one embodiment, a reference pattern 159 might include an image that is geometrically defined to resemble the shape of a grain kernel, a piece of straw (or both—as shown) or some other component expected to flow across the plate member. The reference pattern 159 may include such shapes being located at specified locations along the plate member 142A, such as at or near the corners thereof. The reference pattern 159 may be formed such that the geometric shapes also exhibit a fluorescent signal similar to that of the component they are emulating.

In operation, the reference pattern 159 is taken into account by the image processors 158A and 158B and may be subtracted from the overall image projected from the plate member 142A as a "background." An algorithm may then be employed by the image processors, or by another processor (not shown), to look for "grain-like" components by examining the images to ascertain geometric characteristics of individual components of the residual material. For example, an algorithm may be used to search for components having substantially round, circular geometric profiles and associate such profiles with grain kernels (e.g., the first component 144). The algorithm may also be used to check for abnormalities such as oddly shaped components exhibiting a fluorescent signal other than that which is expected for a particular geometric profile. The monitoring apparatus 150 may, therefore, determine the amount of a given component (e.g., the first component 144) which is present in a flow path of residual material.

It is noted that the monitoring apparatus 150 described with respect to FIGS. 3A and 3B is exemplary and that various modifications may be made thereto depending, for example, on the type of material being harvested and the plant component to be monitored thereby. For example, an excitation signal may exhibit other or additional wavelengths depending on the component or components to be detected by the monitoring apparatus 150. Other types of sensors 157A and 157B, such as, for example, photodiodes, may be also used to detect the fluorescence emissions of various components in the flow path and discriminate between such components. Also, additional analyzers 155A and 155B may be used, for example, to assist in detecting additional components of the residual material flowing across the plate member 142A.

In some embodiments, the monitoring apparatus 150 may further include structure to provide a desired level of isolation from other potentially interfering excitation sources such that the sensors do not produce an inaccurate reading. Such structure may include, for example, a light shield (not shown) configured to shade at least a portion of a flow path across the plate member from direct or indirect light which has been produced by sources other than the excitation source 151.

Figure 4:
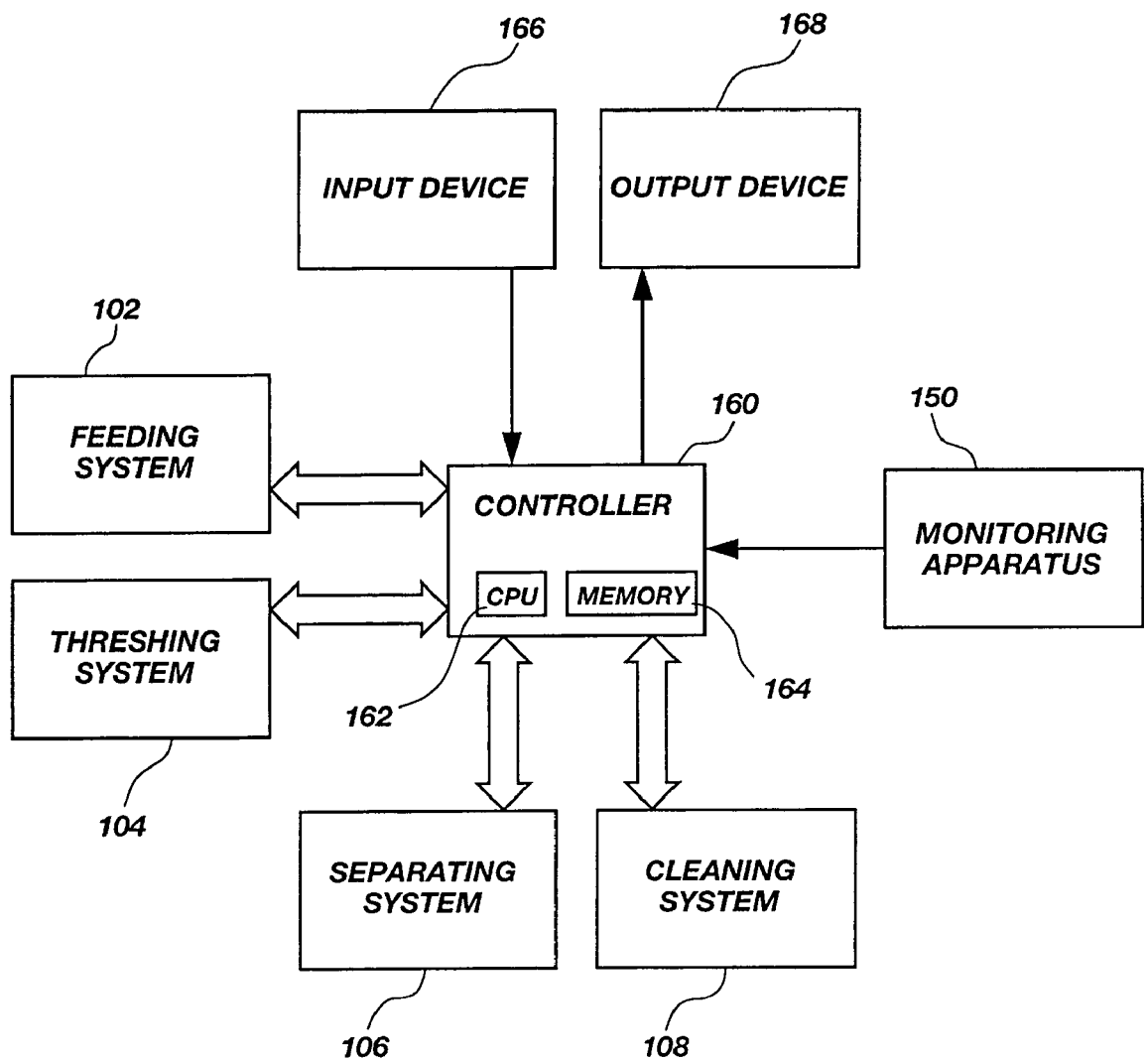
FIG. 4 is a schematic regarding the control of a harvesting machine in accordance with an embodiment of the present invention.

As indicated above, the monitoring apparatus 150 may be used to monitor grain loss and to effect a change in an operational parameter of the combine harvester 100 (FIG. 1) at least partially responsive thereto. Referring briefly to FIG. 4, a controller 160 may be used to adjust the settings of one or more components or systems of the combine harvester 100 based, at least in part, upon signals generated by the analyzers 155A and 155B (FIGS. 3A and 3B) of the monitoring apparatus 150. Such a controller 160 may include, for example, a computer having a central processing unit 162 and a memory device 164. The controller 160 may be operably coupled with the feeding system 102, the threshing system 104, the separating system 106, the cleaning system 108 and/or the systems' various individual components. The controller 160 may further include an input device 166 and an output device 168 for interaction with an operator of the combine harvester.

Thus, for example, referring to FIGS. 1-4, if the monitoring apparatus 150 generates a signal indicating an excessive or undesirable loss of grain, the controller 160 may adjust the speed of the fan 136, the speed of the rotors 120A and 120B, the force being applied between the rotors 120A and 120B and the concaves 122A and 122B, the ground speed of the combine harvester 100, the size of the openings in the sieves 126 and 128 (where adjustable sieves are being utilized) or some other appropriate parameter. Similarly, if the monitoring apparatus 150 generates a signal indicating a relatively low level of grain loss, the controller 160 or the operator, through manual adjustments, may adjust one or more parameters to increase the efficiency of the combine harvester 100 such that relatively more grain is harvested in relatively less time.

In another embodiment, the monitoring apparatus 150 may be used to monitor the loss of some other component rather than grain. For example, as discussed above, if another component, such as the internodal stems, of a plant material is being harvested, the monitoring apparatus may be used to monitor the flow path of residual plant materials for the presence of such internodal stems. In yet another embodiment, a monitoring apparatus 150 may be used to monitor the flow path of cleaned grain (e.g., as the grain is being transported to the storage tank 136) to determine whether chaff or other undesirable components are not being properly cleaned and separated from the grain.

Furthermore, it is noted that a monitoring apparatus 150 as shown and described herein, may detect various characteristics exhibited by the harvested grain (or other plant component) such as the moisture content thereof. For example, it may be known that a specific plant component exhibits a signal (e.g., fluorescence emission) at a nominal wavelength in response to a source or excitation signal. However, the wavelength might vary within a specified range depending on its moisture content. Thus, the monitoring apparatus 150 may be used to substantially determine the moisture content of a harvested plant component and produce a signal representative thereof to the controller 160 or to an operator of the combine harvester 100 such that the controller 160, or the operator, may make any necessary adjustments to the various components and systems as discussed above.

It is noted that the monitoring apparatus 150 may include multiple excitation sources 151 and/or multiple analyzers 155A and 155B configured and located to monitor the entire width or cross sectional area of a given flow path of plant material. However, in other embodiments, it may be desirable to provide an excitation source 151 and one or more analyzers 155A and 155B which only monitor a select portion or section of a given flow path. Thus, for example, it may be possible to monitor a select portion (e.g., one half, one fourth, etc.) of the flow path to obtain a relatively accurate approximation of how much grain (or other monitored component) is flowing therethrough.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A combine harvester comprising:
a feeding system located and configured to gather an amount of plant material as the combine harvester traverses a field;
a threshing system located and configured to receive the plant material from the feeding system and thresh at least one selected plant component from the plant material;
a cleaning system located and configured to substantially separate the at least one selected plant from residual plant material;
a monitoring apparatus located and configured to detect the presence of the at least one selected plant component from residual material in a defined flow path, wherein the monitoring apparatus includes at least one excitation source configured and located to direct an excitation signal toward at least a portion of the defined flow path, and at least one sensor configured to detect a signal initiated by the presence of the at least one selected plant component responsive to the excitation signal; and
a structure over which the defined flow path passes, the structure including a reference pattern for detection by the monitoring apparatus, wherein the reference pattern includes indicia representative of the at least one selected plant component.

2. The combine harvester of claim 1, wherein the sensor is configured to detect a fluorescent signal emitted from the at least one selected plant component responsive to the excitation signal.

3. The combine harvester of claim 2, wherein the at least one excitation source includes a light source configured to emit light at a specified wavelength.

4. The combine harvester of claim 2, wherein the at least one excitation source is configured to emit light at a wavelength of approximately 375 nanometers.

5. The combine harvester of claim 2, wherein the at least one excitation source includes a strobe light.

6. The combine harvester of claim 1, wherein the at least one sensor includes a photodiode.

7. The combine harvester of claim 1, further comprising a source filter associated with the at least one excitation source located and configured to define a frequency of the at least one excitation signal.

8. The combine harvester of claim 7, wherein the structure over which the defined flow path passes is substantially transparent.

9. The combine harvester of claim 8, wherein the substantially transparent structure is formed of a material comprising quartz glass.

10. The combine harvester of claim 1, further comprising a controller operably coupled with the monitoring apparatus and configured to receive a signal generated by the at least one sensor representative of the emitted signal detected thereby.

11. The combine harvester of claim 10, wherein the controller is further operably coupled with the feeding system and configured to alter an operation of the feeding system responsive to the signal generated by the at least one sensor.

12. The combine harvester of claim 10, wherein the controller is further operably coupled with the threshing system and configured to alter an operation of the threshing system responsive to the signal generated by the at least one sensor.

13. The combine harvester of claim 10, wherein the controller is further operably coupled with the cleaning system and configured to alter an operation of the cleaning system responsive to the signal generated by the at least one sensor.

14. The combine harvester of claim 10, further comprising a separating system configured to provide substantial separation of the at least one selected plant component which may be remaining in the residual material subsequent the threshing of the plant material.

15. The combine harvester of claim 14, wherein the controller is further operably coupled with the separating system and is configured to alter an operation of the separating system at least partially responsive to the signal generated by the at least one sensor.

16. The combine harvester of claim 1, wherein the defined flow path includes a flow path between the cleaning system and a discharge area of the combine harvester.

17. The combine harvester of claim 1, wherein the at least one selected plant component includes grain.

18. The combine harvester of claim 1, wherein the at least one selected plant component includes internodal stems.

19. The combine harvester of claim 1, wherein the monitoring apparatus is further configured to determine a specified characteristic of the at least one selected plant component.

20. The combine harvester of claim 19, wherein the monitoring apparatus is configured to determine the moisture content of the at least one selected plant component.

21. The combine harvester of claim 1, wherein the at least one selected plant component comprises a plurality of selected plant components.

22. The combine harvester of claim 21, wherein the plurality of selected plant components comprises grain and at least one other selected plant component.

23. The combine harvester of claim 22, wherein the at least one other selected plant component includes internodal stems.

24. The combine harvester of claim 1, wherein the at least one sensor comprises at least one charge-coupled device (CCD) array.

25. The combine harvester of claim 10, wherein the at least one sensor comprises at least one charge-coupled device (CCD) array.

26. The combine harvester of claim 10, further comprising a source filter associated with the at least one excitation source located and configured to define a frequency of the at least one excitation signal.

27. The combine harvester of claim 10, wherein the sensor is configured to detect a fluorescent signal emitted from the at least one selected plant component responsive to the excitation signal.

28. The combine harvester of claim 10, wherein the at least one excitation source includes a light source configured to emit light at a specified wavelength.

29. The combine harvester of claim 28, wherein the at least one excitation source is configured to emit light at a wavelength of approximately 375 nanometers.

30. The combine harvester of claim 28, wherein the at least one excitation source includes a strobe light.

* * * * *